United States Patent

Boiron et al.

[11] Patent Number: 5,145,737
[45] Date of Patent: Sep. 8, 1992

[54] SYSTEM FOR CLOSURE AND SUBSEQUENT OPENING OF STERILIZABLE CONTAINERS

[75] Inventors: Guy F. V. Boiron, Wintzenheim; Laurent Kretz, Selestat, both of France

[73] Assignee: Societe Alsacienne D'Aluminium, France

[21] Appl. No.: 732,447

[22] Filed: Jul. 18, 1991

Related U.S. Application Data

[63] Continuation of Ser. No. 316,813, Feb. 28, 1989, abandoned.

[30] Foreign Application Priority Data

Mar. 4, 1988 [FR] France .................. 88 02774

[51] Int. Cl.⁵ .............................. B32B 15/08
[52] U.S. Cl. .................. 428/334; 428/34.1; 428/40; 428/349; 428/458; 428/461
[58] Field of Search .......... 428/461, 34.1, 40, 349, 428/334, 458

[56] References Cited

U.S. PATENT DOCUMENTS 4,673,601 6/1987 Lamping et al. .................. 428/40 X

FOREIGN PATENT DOCUMENTS 160975 11/1985 European Pat. Off. .
207626 7/1987 European Pat. Off. .
1536428 12/1978 United Kingdom .
1589923 5/1981 United Kingdom .

*Primary Examiner*—Thomas J. Herbert, Jr.
*Attorney, Agent, or Firm*—Lucas & Just

[57] ABSTRACT

The system for closure and subsequent opening of the sterilizable container is made up of a cover having its sealing layer which bonds to the cover where the sealing layer is made of a polymeric material such as high density polyethylene, polypropylene and polyester and the container, at the point where the cover is sealed to the container, is also made of the same polymeric material as the cover's sealing layer. Between 15 to 50% by weight of inert filler is used. The cover and container are joined by deep soldering so that the action of pulling the cover off of the container causes an internal breaking of the material containing the inert filler. An inert filler is incorporated into the sealing layer and can also be incorporated into the container where the cover and container are joined.

10 Claims, 1 Drawing Sheet

SYSTEM FOR CLOSURE AND SUBSEQUENT OPENING OF STERILIZABLE CONTAINERS

This is a continuation of application Ser. No. 316,813, filed Feb. 28, 1989, now abandoned.

The present invention relates to a process for the closure and subsequent opening of sterilizable containers, to the opercular covers used in carrying out said process and to a process for manufacturing said covers.

More and more now, for packing and preserving foodstuffs, it is known to use sterilizable containers which are hermetically sealed by opercular covers; it is also known to use bags which are formed of two walls, each one of which walls has, within the scope of the invention, the same roles as an opercular cover. To obtain that such containers are tightly and reliably sealed for long periods of time, it is important to make a "deep soldering" between the container and opercular cover. Such "deep soldering" means that there is actual melting and interpenetration between the soldered materials. Such a soldering however has the disadvantage of making the subsequent action of opening the container very difficult.

It is the object of the present invention to overcome this technical drawback by providing a hermetic bond between a container and its opercular cover by "deep soldering", as well as making subsequent opening easy.

Various devices have already been proposed for solving the aforesaid technical difficulty, for example by U.S. Pat. No. 4,673,601 and British Patent 1 536 428, which patents recommend, in order to ensure easy opening, to use a low-resistance bond between the layer of sealable material and the adjacent layer and to weaken the resistance of the layer of sealable material either by providing breaking lines in said layer, as proposed by U.S. Pat. No. 4,673,601, or by using very thin sealable layers, of 10 μm maximum, as proposed in British Patent 1 536 428. Another solution has been proposed by British Patent 1 589 923 and recommends to open a heat-sealed container by tearing off one part of the cover situated outside the sealing surface. Yet another solution has been proposed in European Patent 0 207 626 which recommends to open a heat-sealed container by peeling off its opercular cover, said cover comprising a superficial layer of propylene-maleic anhydride copolymer, which is known to have adhesive properties, and which layer is made to adhere on a trough-like container of which the superficial layer is constituted of a filled mixture of two polypropylenes.

This last patent is, among the prior art, that which is most pertinent to the present invention which is based on the fact that, by admitting a suitable filler in a polyolefin layer, it is possible to preserve in that layer properties which will allow "deep soldering" with an adjacent layer of a polyolefin of similar nature, so that, by applying an adequate pulling pressure on the opercular cover, the container can be readily opened by internal breakage of the filled layer of polyolefin.

The present invention therefore relates to a process for closing and easy re-opening of a container by using an opercular cover which is sealed by "deep soldering" on the edge the container, which process is characterized in that:

the materials involved in said deep soldering are of identical nature and are selected from high density polyethylene, polypropylene and polyester, and form at least one layer of thickness varying between 20 and 100 μm;

at least one of said materials involved in said soldering comprises between 15 and 50% by weight of an inert filler; the quantity of filler being selected, as a function of the nature of said material, so that the action of pulling on the opercular cover, causes an internal breaking of said filled material.

These and other aspects of the present invention may be more fully understood by reference to the drawings.

FIG. 1 illustrates a cover affixed to a container in accordance with the present invention;

FIG. 2 illustrates a cover being separated from a container wherein inert filler is contained in the cover only in accordance with the present invention; and FIG. 3 illustrates a cover being separated from a container wherein inert filler is in both the cover and the edge of the container.

BRIEF DESCRIPTION OF THE DRAWINGS

Referring first to FIG. 1, this shows:

in 1, the wall of the container; this wall ends on its upper periphery, into a flat horizontal edge 2, in 3, an opercular cover formed of a plurality of layers of materials 4, 5 and 6, sealing of the opercular cover on the horizontal edge of the container is achieved by a "deep soldering" in 7 of the lower material 6 of the opercular cover, with the material forming the edge 2 of the container; these two materials are of identical nature, for example both are polypropylene. Said sealing is performed, as conventionally done in other packing techniques, on a strip of suitable width, the outer edge of said strip being situated at a certain distance from the edge of the opercular cover, this enabling grasping of said edge, in order to open the container. In the figures, said sealing zone is illustrated by two broken lines.

Figure 2:
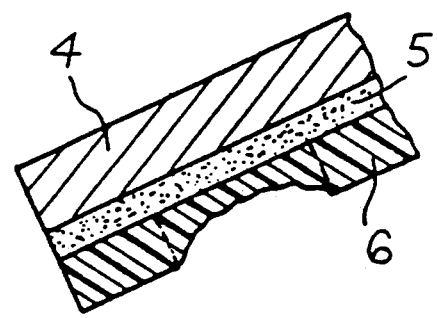
Figure 2:
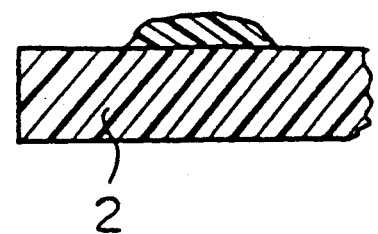

Assuming that the lower material 6 of the opercular cover has received an adequate filler; when opening the container by applying a vertical pulling force on the outer edge of the opercular cover, the material 6 will undergo an internal breakage and there will be separation as illustrated in FIG. 2 where it is shown that part of the lower material 6 has remained attached to the opercular cover whereas another part has remained attached to the edge of the container.

Figure 3:
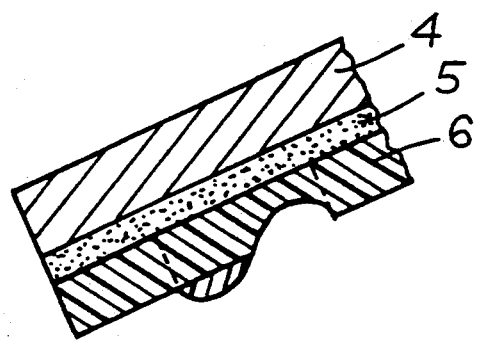
Figure 3:
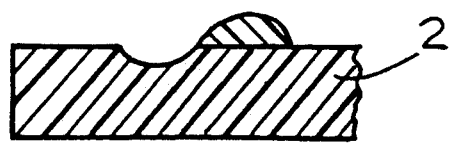

Assuming that the edge of the container 2 and the lower material of the opercular cover have both received an adequate filler; by applying a vertical force on the outer edge of the opercular cover, the two filled materials will be undergoing internal breakage, one part of material 2 remaining attached to the opercular cover and one part of material 6 remaining attached to the container. This is what is illustrated in FIG. 3.

"Container" in the present application should be understood to mean any receptacle such as bottles, pots or trough-like containers, or sheets forming bags with an identical or near-identical sheet forming the opercular cover; the material constituting said container should be able to withstand sterilization and to undergo, without deteriorating, heatings in boiling water. Said material is most often constituted by a thermoshapable multilayered plastic material; it will be noted that the upper layer, namely that facing the opercular cover, is constituted entirely or only partly, i.e. on the edges of the container, of the same material as that constituting the lower layer of the opercular cover.

By "filler", which must be contained in at least one of the materials involved in the sealing, is meant any pulverulent material, inert toward the plastic material containing and filler. The fillers may be for example, mineral fillers such as calcium carbonate or talc, or pigments.

Preferably, the mean granulometry of said filler should not be too large: it should for example be between 0.5 and 50 µm It has been indicated that the quantity of filler could represent between 15 and 50% by weight of the material containing it; if the proportion of filler is less than about 15%, the material containing the filler will not be brittle enough to be internally broken by pulling on the opercular cover; if the proportion of filler is greater than about 50%, the material will lose some of its physical properties, and it will not be possible to extrude it or solder it in really good conditions.

The best way of carrying out the invention consists in having the filler in the lower layer of the opercular cover. This explains why the present invention also relates to this opercular cover and to the method of producing it.

Figure 1:
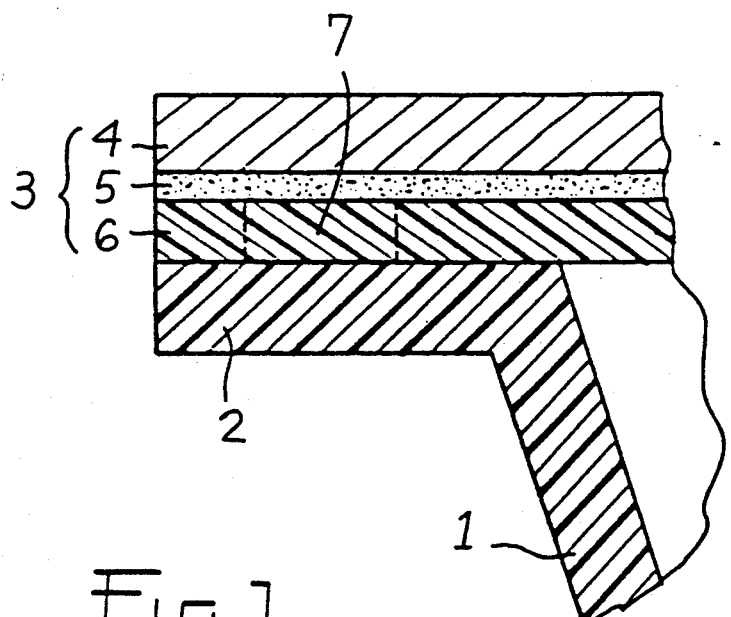

As illustrated in FIG. 1, the opercular cover is, theoretically formed of three layers 4, 5 and 6.

Layer 4 is the outer layer; such a layer is for example formed of an aluminium foil of thickness ranging between 20 and 200 µm; the advantage of this aluminium foil is that it can withstand sterilization and heating temperatures, it forms an efficient barrier against gases and flavors, and it offers excellent possibilities for decoration. Moreover, aluminium being a good conductor, heat-sealing of the opercular cover will be performed readily and in good conditions.

Layer 5 is a bonding layer designed to constitute a bond between layer 4 and layer 6. Said layer will be constituted by a polyolefin-type polymer material, capable of forming a film and which will have been modified by copolymerization or grafting in order to introduce therein certain active functions, such as acid functions for example, which will give it adhering properties toward the adjacent layers. Said layer is preferably of thickness ranging between 2 and 20 µm.

Layer 6 is a sealing layer; it is made, as indicated hereinabove, from a high density polyethylene, a polypropylene or a polyester. It contains between 15 and 50% by weight of filler. Its thickness, in order to obtain a very strong and reliable "deep soldering", is between 20 and 100 µm.

Such an opercular cover is obtained, according to the invention, by co-extruding-laminating the films constituting it; this technique makes it possible to assemble all three layers in one operation, and it eliminates the need for a primary adhering layer or for multiple intermediate layers are found in prior opercular covers; it also eliminates the need for using, during manufacture, adhesives and, hence organic solvents. All risks of contamination through the successive phases of production are thus eliminated, as well as the release and dispersion of solvents on the manufacturing premises and in the surrounding environment.

The following non-restrictive example is given to illustrate the invention:

a container is used which has been thermoshaped from a multilayerd plastic material of which one of the outer layers, namely the layer which will form the internal layer of the container and the upper layer of the edges of said container, is in polypropylene, an opercular cover is formed by co-extrusion-laminating, said cover being constituted by a layer of aluminium of 100 µm thickness, a layer of polypropylene, of 5 µm thickness, on which maleic acid has been grafted, and a layer of polypropylene of 50 µm thickness, containing 20% of a calcium carbonate of about 10 µm mean granulometry.

An assembly is thus obtained which is sealable by deep soldering, and which, thereafter, can withstand sterilization cycles at 120° C. for one hour, then subsequently, heatings in boiling water for 30 minutes, and finally, which can be easily opened. Said assembly is very suitable for use on packing machines, particularly since its opening is not so much dependent on the heat-sealing conditions as on the composition of the layer containing the filler.

It is worth noting:

that the deep soldering of relatively thick layers of plastic material brings added security if, when filling the containers, their edges have been splashed by the contents;

that although experience has proved so far that the only thermoplastic materials effectively used are high density polyethylene, polypropylene or polyester, it is quite conceivable that other sterilizable thermoplastics, such as a polycarbonate or a polysulfone for example, could also be used following the same principles of deep soldering and of weakening of the inner cohesion by addition of fillers.

What is claimed is:

1. A system for forming a sealed container wherein said sealed container can be sterilized, said system comprising:
    (a) a cover for sealing a container so as to form said sealed container which can be sterilized, said cover comprising:
    (aI) an outer layer which forms a barrier between the inside of the container and the outside of the container, said outer layer capable of withstanding sterilization of the sealed container;
    (aII) a sealing layer for forming a seal by means of deep soldering between said outer layer and the container, said sealing layer comprising a polymeric material, and about 15% to about 50% by weight of an inert filler, said polymeric material being identical to a material from which the container is made of at the point where the seal is formed between said sealing layer and said container, said inert filler being such that when the cover is pulled off of the container the sealing layer splits leaving a protion of the sealing layer as continuous while neither the container nor the outer layer break during the opening, said sealing layer having a thickness of about 20 microns to about 100 microns; and
    (aIII) a bonding layer which adheres to both the outer layer and the sealing layer and bonds the sealing layer to the outer layer such that the sealing layer internally splits during opening of the sealed container thereby learing a continuous portion of the sealing layer attached to the outer layer.

2. The cover of claim 1 wherein the outer layer has a thickness of about 20 microns to about 200 microns.

3. The cover of claim 1 wherein the bonding layer has a thickness of about 2 microns to about 20 microns.

4. The system of claim 1 wherein the sealing material is polypropylene and the inert filler is one or more components selected from the group consisting of a mineral filler and a pigment.

5. The system of claim 1 wherein the sealing material is polypropylene and the inert filler is one or more components selected from the group consisting of a mineral filler and a pigment.

6. The system of claim 1 wherein:
a) the outer layer comprises an aluminum foil having a thickness between about 20 μm and about 200 μm; and
b) the bonding layer comprises a layer of polyolefin which has been graft-polymerized such that the bonding layer adheres to the outer layer and the sealing layer.

7. The system of claim 1 wherein said polymeric material is selected from the group consisting of high density polyethylene, polypropylene and polyester.

8. The cover of claim 1 wherein the inert filler is selected from the group consisting of mineral fillers and pigments.

9. The cover of claim 1 wherein the outer layer is aluminum foil.

10. The system of claim 1 wherein said material from which the container is made at the point where the seal is formed between said sealing layer and said container further comprises about 15% to about 50% by weight inert filler.

* * * * *

UNITED STATES PATENT AND TRADEMARK OFFICE
CERTIFICATE OF CORRECTION

PATENT NO. : 5,145,737
DATED : September 8, 1992
INVENTOR(S) : Guy F. V. Boiron et al.

It is certified that error appears in the above-identified patent and that said Letters Patent is hereby corrected as shown below:

Column 3, line 4, change "and" to --said--;
line 55, change "are" to --as--;
line 65, change "multilayerd" to --multilayered--.

Column 4, line 52, change "pretion" to --portion--;
line 61, change "learing" to --leaving--;
line 63, change "cover" to --system--;
line 65, change "cover" to --system--.

Column 6, line 4, change "cover" to --system--;
line 7, change "cover" to --system--.

Signed and Sealed this

Fifth Day of October, 1993

Attest:

BRUCE LEHMAN

*Attesting Officer*      Commissioner of Patents and Trademarks